US009217639B1

(12) United States Patent
Zhang et al.

(10) Patent No.: US 9,217,639 B1
(45) Date of Patent: Dec. 22, 2015

(54) NORTH-FINDING USING INERTIAL NAVIGATION SYSTEM

(75) Inventors: Qiyue Zhang, Cupertino, CA (US); Michael A. Horton, Mountain View, CA (US); Ralph M. Kling, Sunnyvale, CA (US); Semen Shtigluz, Fremont, CA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 13/424,639

(22) Filed: Mar. 20, 2012

(51) Int. Cl.
*G01C 19/38* (2006.01)
*G01C 19/5656* (2012.01)
*G01C 19/5649* (2012.01)

(52) U.S. Cl.
CPC .......... *G01C 19/38* (2013.01); *G01C 19/5649* (2013.01); *G01C 19/5656* (2013.01)

(58) Field of Classification Search
CPC . G01C 19/38; G01C 19/5649; G01C 19/5656
USPC ............ 701/500, 503, 504, 508, 512; 33/313, 33/318, 321, 324, 326
See application file for complete search history.

(56) References Cited

U.S. PATENT DOCUMENTS

| 8,099,876 | B1 * | 1/2012 | Truncale et al. ................. 33/324 |
| 2007/0282528 | A1 * | 12/2007 | Morgan et al. ................. 701/214 |
| 2009/0119937 | A1 * | 5/2009 | Watson ............................ 33/313 |
| 2011/0015862 | A1 * | 1/2011 | Sato et al. .......................... 702/6 |
| 2012/0059575 | A1 * | 3/2012 | Hartman et al. ............... 701/300 |

OTHER PUBLICATIONS

U.S. Appl. No. 12/579,879, filed Oct. 15, 2009, Inventors Darren S. Liccardo et al.

* cited by examiner

*Primary Examiner* — Thomas Tarcza
*Assistant Examiner* — Kevin Myhre
(74) *Attorney, Agent, or Firm* — Hodgson Russ LLP

(57) ABSTRACT

A true north heading is determined by using gyroscopes of differing accuracy and orienting a gyroscope of a higher accuracy to a direction that is more sensitive to azimuth change (e.g., an east/west direction). A gyroscope with a lower accuracy is placed perpendicular to the gyroscope with a higher accuracy and can be oriented towards a north or south direction. The gyroscopes may be placed on a rotatable platform to properly orient the gyroscopes. The higher-accuracy gyroscope may be implemented by using multiple gyroscopes oriented in the same direction.

17 Claims, 5 Drawing Sheets ical field, satellite signal strength, or other confounding influences, gyroscope-based navigation systems and methods can be a reliable method for determining the heading of a object. However, using gyroscopes having the accuracy needed for navigation, such as ring-laser gyroscopes (RLG) or fiber optic gyroscopes (FOG), can be expensive.

NORTH-FINDING USING INERTIAL NAVIGATION SYSTEM

STATEMENT OF GOVERNMENT INTEREST

This invention was made with government support under Contract No. W15P7T-08-D-P416, awarded by the U.S. Department of Defense. The government has certain rights in the invention.

TECHNICAL FIELD

The present disclosure relates to determining the orientation of a targeting platform and/or the navigation heading of a vehicle. More specifically, the present disclosure relates to inertial north-finding systems.

BACKGROUND

In a variety of applications, the orientation of a platform or the direction of travel of a vehicle (i.e., the heading) is used to point, orient, or guide the platform or the vehicle. Some conventional systems measure the heading using a floating magnetic compass or strap-down magnetic vector sensor, both of which measure the Earth's magnetic field. Other conventional navigation systems use the global navigation satellite systems (GNSS), such as the Global Positioning System (GPS), Galileo, or GLONASS. The accuracy of these conventional navigation systems is, however, influenced by various factors including, for example, signal strength, or local variations in magnetic field.

Gyroscope-based navigation systems may also be used to determine a heading of a vehicle. These systems use the Earth's rotational rate vector as a reference to directly determine the heading of the vehicle. Because measurement of the Earth's rotational rate vector is unaffected by local magnetic fields, satellite signal strength, or other confounding influences, gyroscope-based navigation systems and methods can be a reliable method for determining the heading of a object. However, using gyroscopes having the accuracy needed for navigation, such as ring-laser gyroscopes (RLG) or fiber optic gyroscopes (FOG), can be expensive.

SUMMARY

Embodiments relate to determining a true north heading by using gyroscopes of different accuracies and orienting a gyroscope of a higher accuracy to a direction that is more sensitive to azimuth change (e.g., in east/west direction). A gyroscope with a lower accuracy is placed perpendicular to the gyroscope with a higher accuracy and can be oriented approximately in a north/south direction. The gyroscopes may be placed and rotated on a platform to properly orient the gyroscopes.

The higher-accuracy gyroscope may be implemented by using multiple gyroscopes oriented in the same direction. The measurement error of the multiple gyroscopes can be identified and/or calculated, and removed from the gyroscope measurements. In some embodiments, this error correction can be accomplished when the source of the measurement error is uncorrelated between the multiple gyroscopes.

DETAILED DESCRIPTION

Figure 1:
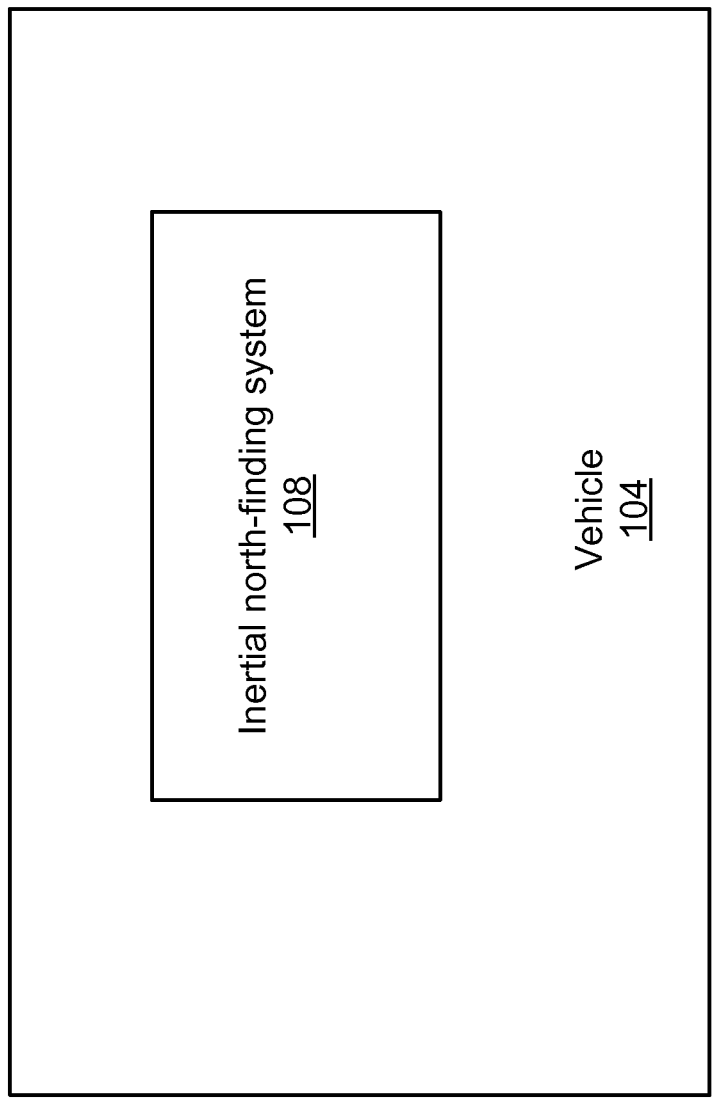
FIG. 1 is a schematic illustration of an embodiment of an inertial north-finding system of the present disclosure used as part of a navigation system of a vehicle.

The Figures (FIG.) and the following description relate to preferred embodiments of the present invention by way of illustration only. It should be noted from the following discussion, that alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only.

Embodiments of the present disclosure relate to determining a true north heading or orientation with respect to true north by using gyroscopes of different accuracies and orienting a gyroscope of a higher accuracy to a direction that is more sensitive to azimuth change (e.g., in the east/west direction). In one embodiment, a gyroscope with a lower accuracy is placed perpendicular to the gyroscope with a higher accuracy and can be oriented approximately in a north/south direction. The gyroscopes may be placed and rotated on a platform to properly orient the gyroscopes. The higher-accuracy gyroscope may be implemented by using multiple gyroscopes oriented in the same direction. In another embodiment, the true north heading or orientation with respect to true north can be determined by roughly orienting a gyroscope from approximately 0° to approximately 30° from true north, and then using the gyroscope to determine a more precise heading or orientation.

A gyroscope as described herein refers to a sensor or a device for measuring angular rotation of a body about a predetermined axis. The gyroscope may include, for example, a microelectromechanical systems (MEMS) gyroscope, a ring-laser gyroscope (RLG) or fiber optic gyroscope (FOG) or a conventional mechanical gyroscope. The accuracy of the gyroscope can depend on the type or structure of the gyroscopes used.

A vehicle described herein refers to a body that can travel from one point to another point. Types of vehicles can include land transport vehicles, water-going vessels, and air vehicles. Some vehicles can be self-propelled. Example of vehicles can include, but are not limited to, an automobile, a truck, a tank or mobile artillery unit, a remote or autonomously controlled robot (e.g., the Mars Rover, or a mobile terrestrial robot), other manned or un-manned ground vehicles, an airplane, a helicopter, a missile or other un-manned projectile, an unmanned airplane, a spacecraft, an ocean-going ship, a ship-mounted artillery unit, or a drilling platform.

While a vehicle is used throughout the present disclosure for illustration purposes, embodiments herein are equally applicable for determining the spatial orientation with respect to true north of stationary objects, such as a targeting platform. The targeting platform described herein refers to a platform which provides an azimuth and attitude reference. Types of targeting platforms can include optical targeting systems, weapon targeting devices, orientation references for construction and/or survey applications, personal handheld targeting modules, and other applications in which heading determination is useful.

Embodiment of an Inertial North-Finding System

FIG. 1 schematically illustrates a vehicle 104 that includes an inertial north-finding system 108 of the present disclosure. The inertial north-finding system 108 functions to determine the direction regardless of the position or orientation of the vehicle 104. Instead of finding the north direction relative to a main portion of the body of the vehicle 104, the north-finding system 108 may be part of a component in the vehicle 104 that can move or rotate relative to other parts of the vehicle, such as a turret. In such instances, the inertial north-finding system 108 may determine the north direction regardless of the position and orientation of such a component in the vehicle 104. The inertial north-finding system 108 is equally applicable to a targeting platform.

Figure 2:
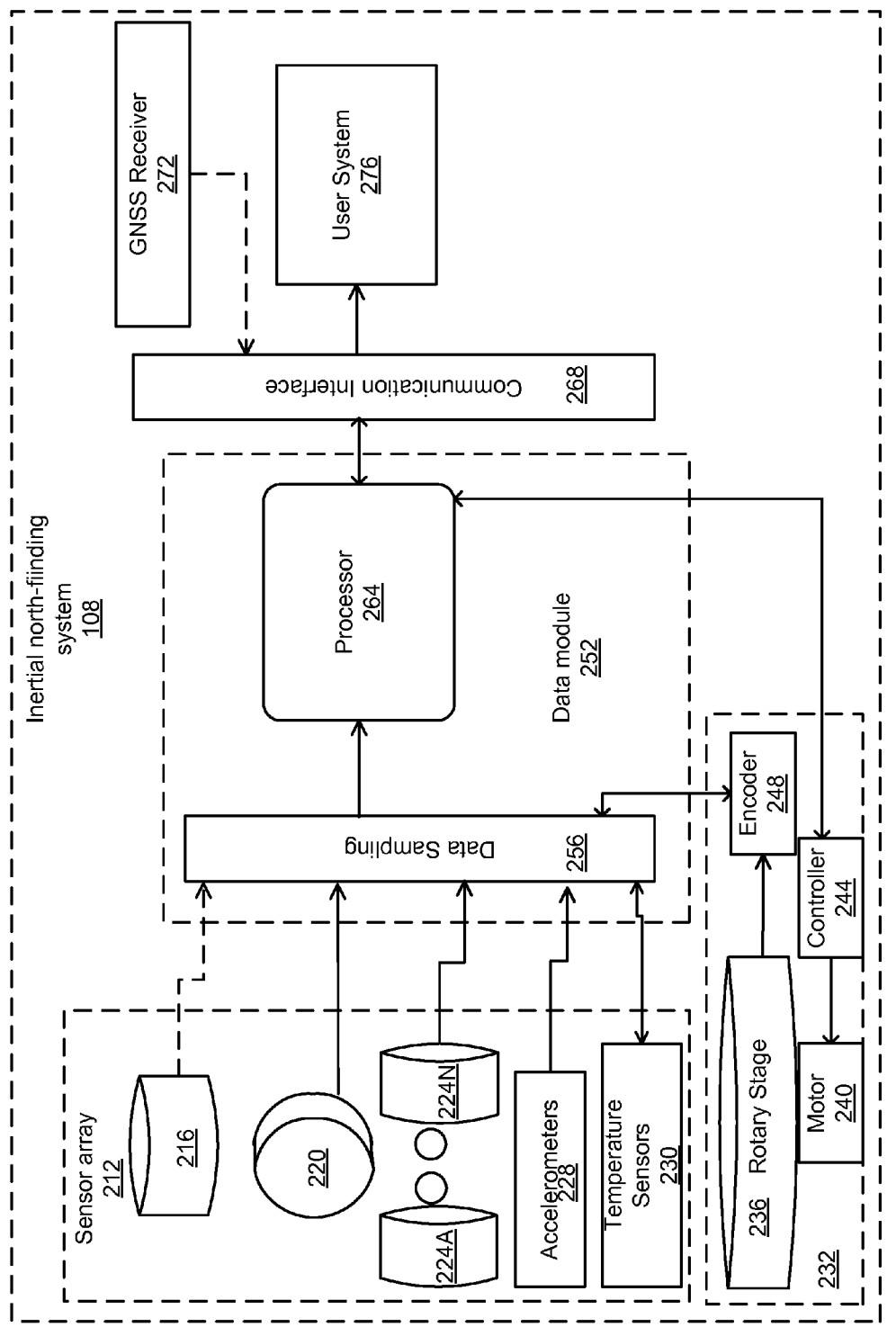
FIG. 2 is a schematic illustration of an embodiment of an inertial north-finding system of the present disclosure, and example components used therein.

FIG. 2 depicts one embodiment of the inertial north-finding system 108. The system 108 may include, among other components, a sensor array 212, a rotary stage assembly 232, a data module 252, a communication interface 268, a Global Navigation Satellite System (GNSS) receiver 272, and a user system 276. The various components comprising the aforementioned modules, their components, and any interactions thereof, are described in more detail below.

The embodiment of the sensor array 212 depicted in FIG. 2 includes a z-axis gyroscope 216, an x-axis gyroscope 220, a y-axis gyroscope 224 (in one embodiment formed from two or more gyroscopes 224A through 224N that collectively operate as a single higher accuracy gyroscope), accelerometers 228, and temperatures sensors 230. In some embodiments, only the y-axis gyroscope 224 is needed for north finding. The x-axis, y-axis, and z-axis are defined in this example by the body-frame of the vehicle 104 (illustrated in relationship to the vehicle in FIG. 4 as a "North-East-Down" reference frame). In this embodiment, the y-axis gyroscope 224 has a higher accuracy compared to the x-axis gyroscope 220. For this purpose, the y-axis gyroscope 224 may be of a different type of gyroscope than the x-axis gyroscope 220 or may be multiple gyroscopes operating collectively for a higher accuracy.

In some embodiments, the sensors 216, 220, 224, 228, and 230 take measurements at a frequency of about 1000 Hz. Furthermore, the presence of the z-axis gyroscope 216 is optionally included in the system 108, and used for determination of vehicle yaw. As with the gyroscopes 216, 220, 224A and 224B, the accelerometers 228 can be of any type.

When multiple gyroscopes 224A through 224N operate as a single y-axis gyroscope, the gyroscopes 224A through 224N are all aligned along the y-axis of the body-frame of the vehicle 104. As mentioned above, two or more gyroscopes aligned in the same direction can be used collectively to improve the accuracy of the measurements in that direction. The mathematical tools underpinning this improvement will be explained in more detail in the context of FIG. 5. Furthermore, the accuracy of the north-finding function of the system 108 can be improved when the gyroscope 224 is aligned with the east/west direction, as explained in the context of FIG. 3.

The temperature sensors 230 measure the temperature of the various sensors of the sensor array 212, and of the components of the data module 252. These temperature measurements are then provided to a data sampling module 256, or alternatively, directly to a processor 264, in order to correct for temperature-related measurement artifacts. For example, if the system 108 is used in an aircraft at a high altitude, the extremely low temperatures at this altitude may introduce error into measurements through, for example, changes in physical dimensions, physical properties, and/or electrical properties of the sensors. By using the temperature sensors 230 to measure the ambient temperatures, whether inside the vehicle, outside the vehicle, or within the sensor array 212 (or within the components thereof), the measurements provided by the sensors of the sensor array can be corrected.

The rotary stage assembly 232 is used to align the y-axis gyroscope 224 (connected to a rotary stage 236) with the east/west direction. As explained in more detail below, aligning the y-axis gyroscope 224 in this manner improves the north-finding function of the system 108. The rotary stage assembly 232 may include, among other components, the rotary stage 236, a rotary stage motor 240, a controller 244, and an encoder 248. In the example shown in FIG. 2, only the components of the sensor array 212 are disposed on the rotary stage 236, although other components from the data module 252, such a data sampling module 256, may also reside on the rotary stage 236.

In this embodiment, the rotary stage 236 is rotated by the motor 240. The motor 240 can include one or more servo-motors, stepper-motors, or other types of motors known in the art for articulating a rotary stage. Furthermore, mechanisms other than those described above can be used to orient the rotary stage 236. For example, pneumatic actuators or hydraulic cylinders may be used to move the rotary stage 236. Further, the movement of the rotary stage 236 need not be one of pure rotation. That is, the movement of the rotary stage 236 may be a combination of linear motion and rotational motion.

In this embodiment, the motor 240 is controlled by the controller 244. The controller 244 receives a signal from the encoder 248, which determines the current rotational angle of the rotary stage 236. Using a signal from the encoder 248, and optionally a signal from the processor 264, that identifies the current orientation of the y-axis gyroscope 224, the controller 244 can rotate the rotary stage 236 by sending a signal to the motor 240 so as to properly orient the gyroscopes 216, 220, 224.

As part of the alignment process, the encoder 248 generates a signal that identifies the rotational angle of the rotary stage 236 that is, in turn, communicated to the controller 244. This signal can then be used to orient the rotary stage 236, and any sensors thereon, with, for example, the east/west direction. In one embodiment, a feedback control loop may be implemented using the controller 244 and the encoder 248 to more accurately control the rotational angle of the rotary platform 236. While the encoder 248 is shown here, other sensors may also be employed to measure rotation and/or linear motion of the rotary stage 236.

Continuing with FIG. 2, data from the sensor array 212 and from the encoder 248 are provided to the data module 252. The data module 252 collects, corrects, and processes the information in preparation for presentation to a user (whether a human or a machine client) of the system 108. In this embodiment, the data module 252 includes a data sampling module 256, and the processor 264. In some embodiments, the temperature sensors 230 may be disposed in the data module 252 instead of within the sensor array 212. The data sampling module 256 periodically receives measurements from the sensors of the sensor array 212. In this embodiment, the data sampling module 256 can receive data provided by these various data sources, as well as retrieve the data by periodically soliciting the data sources for new data. In some embodiments, the data sampling module 256 can receive data at a frequency of about 100 Hz. Also, in this embodiment, the data sampling module 256 is an A/D converter that converts analog signals provided by the data sources into digital signals in preparation for processing at the processor 264. In one embodiment, the data sampling module 256 is capable of 24-bit quantization or higher resolution. In another embodiment, the data sampling module 256 is connected to the processor 264 via a serial peripheral interface bus.

In other embodiments, the data sampling module 256 is unnecessary because data from the gyroscopes, (e.g., the gyroscopes 216, 220, 224, the accelerometers 228, the encoder 248, the temperature sensors 230, and any other data sources), are provided as digital signals directly to the processor 264. Alternatively, the signals are provided as analog signals but are converted to digital signals within the processor 264.

Continuing with the embodiment depicted in FIG. 2, the data sampling module 256 provides the measurement data taken by the sensors of the sensor array 212 to the processor 264. The processor 264 is a hardware component for executing computer instructions. The processor 264 may be embodied, for example, as a digital signal processor (DSP) or as another type of processor. The processor 264 performs various operations on the data, the operations including, but not limited to, providing sensor calibrations and corrections, executing navigation algorithms, and communicating navigation state information to a user through a communication interface 268. In one embodiment, the processor 264 includes a non-transitory computer-readable memory (not shown) that can store one or more of calibration data, device and system configuration data, sensor data, and executable code. In one embodiment, the processor 264 is capable of 64-bit floating computation to compute a precise navigation state using complex algorithms.

Figure 5:
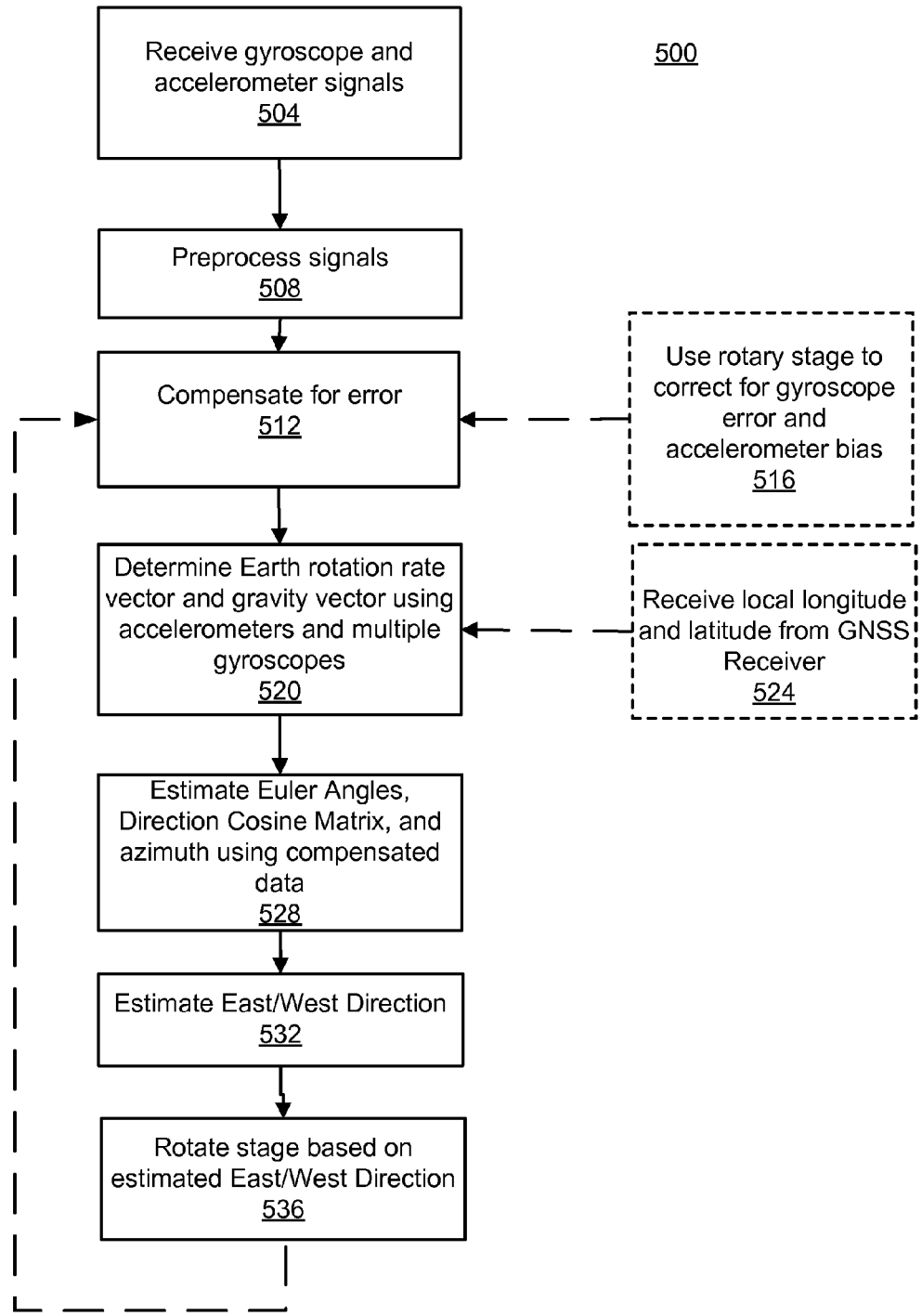
FIG. 5 is an example method of using an embodiment of the present disclosure to determine true north.

After performing all, some, or none, of the above-described operations, the processor 264 provides the processed sensor measurements (including the true-north heading calculated by the processor according to the example method shown in FIG. 5) to the communications interface 268. The communications interface 268 conveys the processed data to a user system 276, which can be accessed by a human user or a client device. Additionally, the communications interface 268 can also be configured to receive input from the user system 276. For example, navigation instructions, data correction, time synchronization messages and location information such as latitude can be communicated to the system 108 using the user system 276. The user system 276 can be, for example, a general purpose computer, a mobile communications device, a specially adapted computer, or any other device used to communicate with a computer system, such as that embodied by the system 108.

Furthermore, the communications interface 268 can optionally receive input from a GNSS receiver 272. Receiving input from the GNSS receiver 272 provides position and time information to the processor 264, which can be used to determine the starting location of the vehicle 104 as an input to the north-finding algorithm. Alternatively, input from the GNSS receiver 272 can be used throughout execution of the north-finding process and/or algorithm as part of an error checking and/or correction method.

In one embodiment, the inertial north-finding system 108 described above is implemented in a rugged enclosure that includes some or all of the components described above. In one embodiment, the system 108 has a compact arrangement achieved through the use of small gyroscopes (e.g., MEMS devices). In another embodiment, the system 108 is implemented on a general purpose computer that is coupled with the rotary stage assembly 232 and the sensor array 212.

Enhanced Accuracy of Y-Axis Gyroscope

Embodiments of system 108 may use multiple lower-accuracy gyroscopes aligned in the same direction, and process signals from these gyroscopes to obtain a signal of higher accuracy. When the source of gyroscope noise is uncorrelated between the y-axis and x-axis gyroscopes, $\epsilon_y$ and $\epsilon_x$ (the error measurements of the two gyroscopes respectively) are reduced by using multiple gyroscopes oriented along an axis—in this embodiment, along the y-axis. For example, the noise level attributable to a single gyroscope is described by Equation 1.

$$M_N = \frac{1}{n}\sum_{i=1}^{n} m_i \qquad \text{Equation 1}$$

where $M_N$ is the average of n measurements of quantity $m_i$ where the standard deviation of $M_n$ is approximately $\sigma_N$ and the standard deviation of $m_i$ is approximately $\sigma_i$. If the measurement noise from each of the gyroscopes is uncorrelated (that is, the sources of measurement noise are independent), the noise from n gyroscopes decreases by a factor of $\sqrt{n}$ as shown below in Equation 2.

$$\sigma_N = \sigma_i/\sqrt{n} \qquad \text{Equation 2}$$

It is the application of Equation 2 to the embodiments of the present disclosure that contributes to the improved north-finding accuracy of arrays of multiple, aligned gyroscopes. That is, the accuracy of the system as a whole can be improved by using multiple gyroscopes, even gyroscopes individually having a lower accuracy.

When using multiple gyroscopes, the signals are received by the data sampling module 256 and their average value is computed. A weighted average method may also be applied if the gyroscopes have different accuracies. As mentioned above, this improvement can be used alone or in combination with aligning the gyroscopes with the east/west direction.

East/West Gyroscope Alignment

Figure 3:
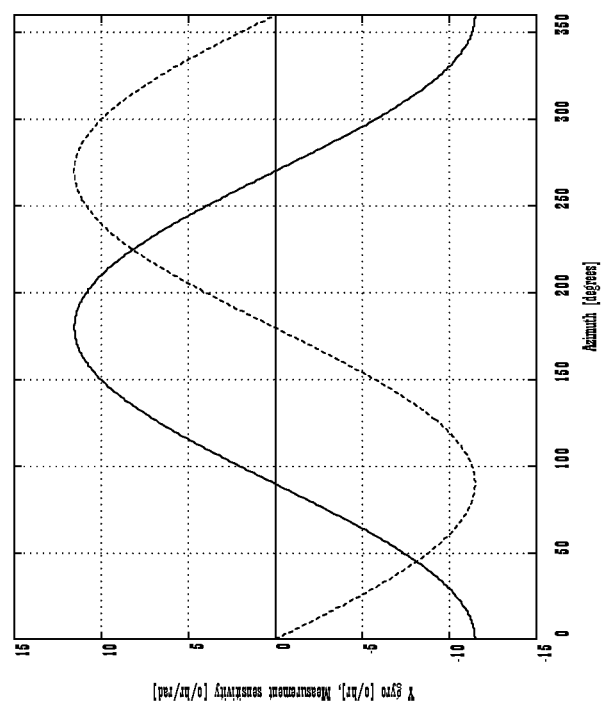
FIG. 3 is an illustration of gyroscope measurement sensitivity to azimuth changes as a function of the azimuth.

As described above, it is advantageous to align the y-axis gyroscope 224 of the north-finding system 108 in the east/west direction to improve the accuracy of the system. As illustrated in FIG. 3, the sensitivity of a gyroscope to changes in the azimuth is significantly improved when the gyroscope is aligned in the east/west direction because a change in angle in this orientation causes a larger change of the Earth Rotation Vector measurement compared to non-east/west direction orientations. Because of this, the gyroscope error, which remains approximately constant regardless of gyroscope orientation, makes a proportionately smaller contribution to the gyroscope measurement.

Figure 4:
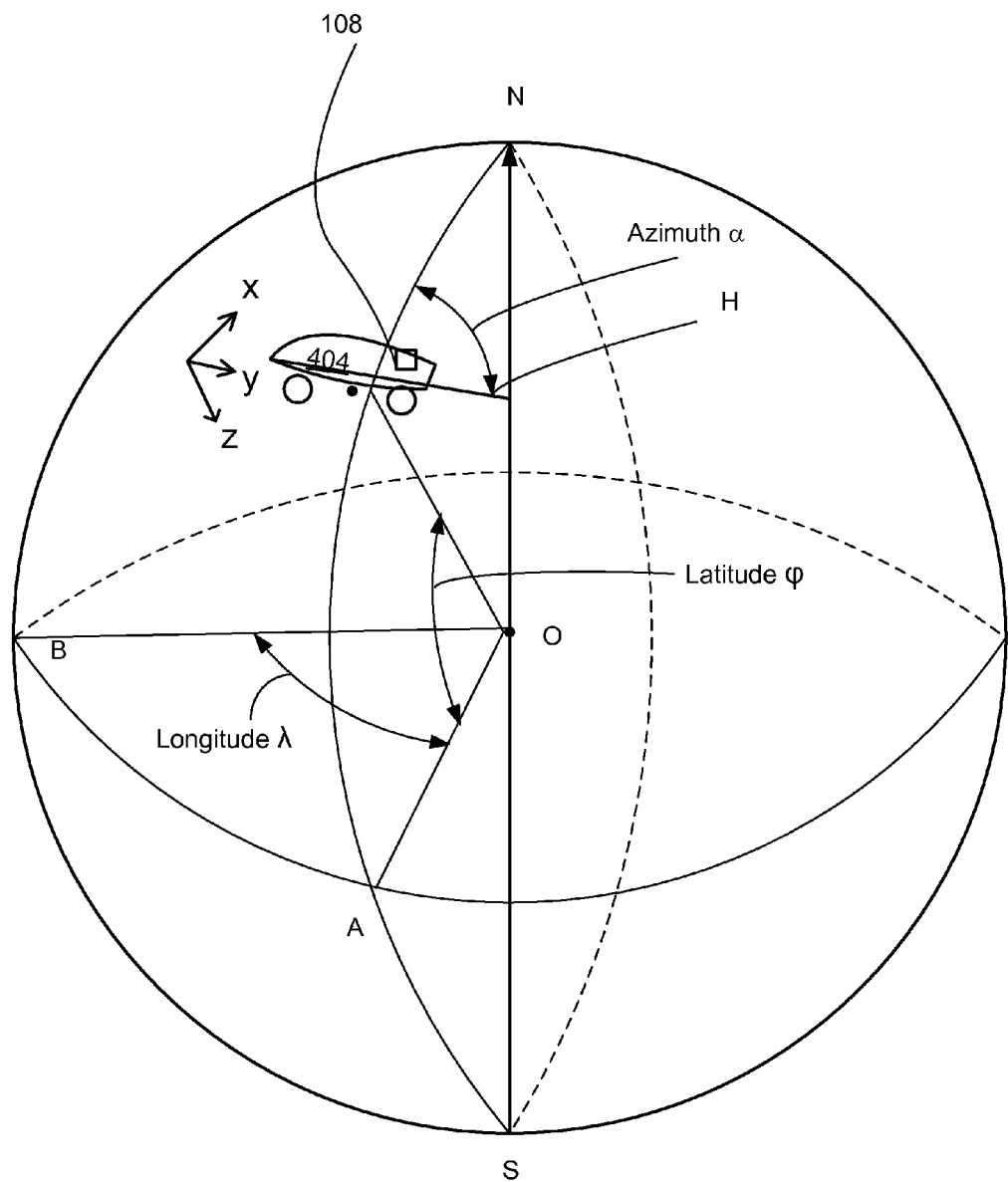
FIG. 4 is an illustration of an embodiment of an inertial north-finding system of the present disclosure used in a land vehicle for determining, for example, true north heading.

FIG. 4 illustrates the system 108 in an example context of a vehicle 404 traveling in the east/west direction at a latitude $\phi$ and a longitude $\lambda$. While any frame of reference can be used, the Equations of the present disclosure use a North-East-Down ("NED") coordinate system, as illustrated by the reference axes shown in FIG. 4. Latitude $\phi$ is measured as an angle between ray OA and a ray connecting origin O with the vehicle 404. Longitude $\lambda$ is measured as an angle from an origin O with respect to rays OA and OB respectively. Azimuth, designated in FIG. 4 as angle $\alpha$, is measured between a meridian PN (connecting the vehicle 404 at latitude $\phi$) and a ray starting at platform origin P and extending in a heading H of the vehicle. The designated angles and rays will be discussed in more detail in the context of FIG. 5.

North-Finding

FIG. 5 illustrates an example method 500 for calculating a true north heading using the embodiments described herein. The system 108 receives 504 signals from gyroscopes, for example, the gyroscopes 220, and 224. The system may also receive 504 signals from the accelerometers 228 and the temperature sensors 230, as described above.

These signals are preprocessed 508 to remove and/or reduce the measurement errors. The preprocessing includes noise filtering, bias and scale factor compensation, and thermal error compensation. These preprocessed signals are used to determine 512 the earth rotation vector and the gravity vector expressed in the body frame using a Kalman filter or other stochastic estimation methods, as described in more detail below.

The preprocessed signals are compensated 512 or otherwise adjusted for error. The noise models for estimating gyroscope error and accelerometer error are used in the Kalman filter or other stochastic estimation methods.

The calculations and/or measurements described above can be compensated 516 for measurement error by reapplying the above described error calculations 512. Also, the rotary stage 236 can be used to correct 516 for gyroscopic error (e.g., drift) and accelerometer bias using a method described, for example, in U.S. patent application Ser. No. 12/579,879, entitled "Heading Determination Using Sensors Mounted on Rotatable Assembly," filed on Oct. 15, 2009, which is incorporated by reference herein in its entirety.

In these contexts, the body frame attitude can be determined 520 in terms of the ERV and the GV as measured by the gyroscopes 216, 220, and 224, and accelerometer 228 of the sensor array 212. One tool for accomplishing this is Equation 3, a direction cosine matrix (DCM). The DCM can be derived from the ERV and the GV, according to Equations 4 through 7.

$$A_{NED}^{Body} = (\bar{a}_1 \quad \bar{a}_2 \quad \bar{a}_3) = \begin{pmatrix} a_{11} & a_{12} & a_{13} \\ a_{21} & a_{22} & a_{23} \\ a_{31} & a_{32} & a_{33} \end{pmatrix} \quad \text{Equation 3}$$

The GV in the body frame measured by the accelerometers can be expressed in Equation 4.

$$\bar{G}_B = A_{NED}^{Body} \bar{G} = G\bar{a}_3 \quad \text{Equation 4}$$

In Equation 4, $$\bar{G} = G \begin{pmatrix} 0 \\ 0 \\ 1 \end{pmatrix},$$

where $\bar{G}_B$ is measured by the accelerometers 228 of the system 104. From Equation 4, the $\bar{a}_3$ of Equation 3 can be determined according to Equation 5.

$$\text{DCM } 3^d \text{ column: } \bar{a}_3 = \bar{e}_G \quad \text{Equation 5}$$

where $\bar{e}_G = \bar{G}_B/G$

The ERV $\bar{\Omega}$ in the NED frame is calculated according to Equation 6 using the measurements from the gyroscopes of the system 108.

$$\bar{\Omega} = \Omega \begin{pmatrix} \cos\varphi \\ 0 \\ -\sin\varphi \end{pmatrix} \quad \text{Equation 6}$$

where $\varphi$ represents latitude and $\Omega$ represents the angular velocity of the vehicle.

Having expressed the GV, the ERV can be determined 520 in the body frame using Equation 7.

$$\bar{\Omega}_B = A_{NED}^{Body} \bar{\Omega} = \Omega(\cos\varphi \bar{a}_1 - \sin\varphi \bar{a}_3) \quad \text{Equation 7}$$

where $\bar{\Omega}_B$ is the ERV in the body frame, which is measured by the gyroscopes 220 and/or 224, $\Omega$ is the angular rate of the vehicle and $\bar{\Omega}$ is the ERV according to Equation 6. The $\bar{a}_1$ value (of Equation 3) can be calculated using Equation 8 with a known $\bar{a}_3$ that is calculated from Equation 5.

Local longitude, latitude, and/or timing information can optionally be received 524 from a GNSS receiver in order to improve some or all of the foregoing calculations. In some embodiments, as described below, receiving this information enables true north estimation in a single iteration of the process 500. In still further embodiments, receiving this information enables determining 512 true north using the ERV and GV.

The Euler angles (e.g., azimuth, pitch, and roll in this case), are estimated 528 using the equations 10 to 13.

$$\text{DCM } 1^{st} \text{ column: } \bar{a}_1 = \frac{\bar{e}_\Omega + \sin\varphi \bar{a}_3}{\cos\varphi} \text{ where} \quad \text{Equation 8}$$

$$\bar{e}_\Omega = \bar{\Omega}_B/\Omega$$

The vector $\bar{a}_2$ of Equation 3 can be calculated from $\bar{a}_3$ and $\bar{a}_1$ using equation 9.

$$\text{DCM } 2^d \text{ column: } \bar{a}_2 = [\bar{a}_3 \times \bar{a}_1] \quad \text{Equation 9}$$

This then enables the estimating 528 of the Euler angles.

Azimuth: $\alpha = \arctan(a_{12}/a_{11})$ or    Equation 10

$\alpha = \arcsin(a_{12})/\cos(\beta)$ When $\beta$ near zero    Equation 11

Pitch ($P$): $\beta = \arcsin(a_{13})$    Equation 12

Roll: $\gamma = \arctan(-a_{23}/a_{33})$    Equation 13

The equation 10 and Equation 11 can also be expressed in the form of Equation 14 and 15

$$\text{azimuth}_{init} = \arctan\left(\frac{r_{hy} - \varepsilon_y}{r_{hx} - \varepsilon_x}\right) \quad \text{Equation 14}$$

where $r_{hy}$ and $r_{hx}$ represent the horizontal components of the earth rotation vector (ERV) measured by the y-axis gyroscope 224 and x-axis gyroscope 220 projected to the horizontal plane, respectively. $\varepsilon_y$ and $\varepsilon_x$ represent measurement errors of the y-axis gyroscope 224 and x-axis gyroscope 220 projected to the horizontal plane, respectively. Equation 14 is used in the initial azimuth estimation. The accuracy of the azimuth estimation is dependent on the accuracies of both the x-axis gyroscope 220 and the y-axis gyroscope 224.

$$\text{azimuth} = \arcsin\left(\frac{r_{hy} - \varepsilon_y}{r_e \cos(\varphi)}\right) \quad \text{Equation 15}$$

where $r_e$ is the earth rotation rate and $\varphi$ is the latitude. When the azimuth is near 0° or near 180° (that is, the y-axis gyroscope 224 is oriented in the east/west direction, the azimuth can be estimated 528 using Equation 15. This equation shows that the accuracy of the azimuth calculation is dependent on the accuracy of the y-axis gyroscope 224. Therefore, in some embodiments, an accurate y-axis gyroscope 224 is used, as described above, to improve the azimuth calculation.

Once the azimuth is estimated 528, the east/west direction can be estimated 532 and the rotary stage 236 can rotate 536 the gyroscopes of the sensor array 212 to align with the east/west direction. This process can optionally be repeated to improve the accuracy of the estimation and bring the y-axis gyroscope 224 sensing axis closer to east/west direction to fully use the sensitivity of the gyroscope. However, as described below, this repetition is not required.

In some embodiments, particularly when initially orienting the system within approximately 0° to 30° of true north, only a single iteration of the above process need be used. In some examples of this embodiment, this initial orientation can be accomplished by using the sunrise, the sunset, the moonrise or moonset, astral alignment, magnetic compass, or other means of approximately orienting the system with true north. In these embodiments, because of the initial orientation of the system 108, only a single gyroscope is needed.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An apparatus for finding true north, comprising:
   a first gyroscope having a first accuracy, and configured to measure a first angular velocity of a vehicle about a first axis;
   a second gyroscope having a second accuracy higher than the first accuracy, and configured to measure a second angular velocity of the vehicle about a second axis that is orthogonal to the first axis; and
   a rotary stage securing the first and the second gyroscopes, the rotary stage configured to align the second gyroscope in an East/West direction; and
   a processor programmed to
   (a) calculate a first true north heading according to $$\text{azimuth} = \arcsin\left(\frac{r_{hy} - \varepsilon_y}{r_e \cos(\varphi)}\right)$$

where the azimuth is the true north heading, $r_{hy}$ is a horizontal component of an earth rotation vector measured by the second gyroscope, $\varepsilon_y$ is an error measurement of the second gyroscope, $r_e$ is an earth rotation rate, and $\varphi$ is the latitude of the vehicle position; and
   (b) estimate a first East/West direction using the calculated azimuth and turn the rotary stage so that the second gyroscope is aligned in the estimated first East/West direction; and
   (c) determine a second true north heading according to $$\text{azimuth} = \arcsin\left(\frac{r_{hy} - \varepsilon_y}{r_e \cos(\varphi)}\right)$$

where the azimuth is the second true north heading, $r_{hy}$ is a horizontal component of an earth rotation vector measured by the second gyroscope aligned in the estimated first East/West direction, $\varepsilon_y$ is an error measurement of the second gyroscope, $r_e$ is an earth rotation rate, and $\varphi$ is the latitude of the vehicle position;
   (d) estimate a second East/West direction using the second true north heading and turn the rotary stage so that the second gyroscope is aligned in the estimated second East/West direction; and
   (e) determine a third true north heading according to $$\text{azimuth} = \arcsin\left(\frac{r_{hy} - \varepsilon_y}{r_e \cos(\varphi)}\right)$$

where the azimuth is the third true north heading, $r_{hy}$ is a horizontal component of an earth rotation vector measured by the second gyroscope aligned in the estimated second East/West direction, $\varepsilon_y$ is an error measurement of the second gyroscope, $r_e$ is an earth rotation rate, and $\varphi$ is the latitude of the vehicle position.

2. The apparatus of claim 1, wherein the second gyroscope includes a plurality of gyroscopes aligned in a same direction, each of the plurality of gyroscopes having an accuracy lower than the second accuracy.

3. The apparatus of claim 2, wherein the plurality of gyroscopes includes a plurality of microelectromechanical (MEMS) gyroscopes.

4. The apparatus of claim 2, further comprising a processor for calculating an error rate for the second gyroscope, the error rate calculated according to $$\sigma_N = \frac{\sigma_i}{\sqrt{n}}$$

where $\sigma_N$ is an error rate of the plurality, $\sigma_i$ is an error rate of a single gyroscope of the plurality, and n is the number of gyroscopes of the plurality.

5. The apparatus of claim 1, wherein the first gyroscope is a first type of gyroscope and the second gyroscope is a second type of gyroscope.

6. The apparatus of claim 5, wherein the second type of gyroscope is a microelectromechanical (MEMS) gyroscopes.

7. The apparatus of claim 1, further comprising a processor in communication with the second gyroscope, the processor configured to estimate a true north direction by processing a signal from the second gyroscope.

8. The apparatus of claim 7, wherein the processor is further configured to correct an Earth Rotation Vector measurement signal by calculating a measurement error of the second gyroscope and removing the measurement error from the Earth Rotation Vector measurement signal.

9. The apparatus of claim 1, wherein the angular velocity is calculated according to $$\overline{\Omega}_B = A_{NED}^{Body}\overline{\Omega} = \Omega(\cos\varphi\overline{\alpha}_1 - \sin\varphi\overline{\alpha}_3)$$

where $\overline{\Omega}_B$ is an Earth Rotation Vector in a frame of reference defined by a body of the vehicle, $\Omega$ is the angular velocity of the vehicle and $\overline{\alpha}_1$ and $\overline{\alpha}_3$ are vectors of a Direction Cosine Matrix, and $\varphi$ is a latitude of the vehicle.

10. The apparatus of claim 1, wherein the processor calculates the horizontal component of the earth rotation vector measured by the second gyroscope according to $$r_{hy} = r_e \cos(\varphi)\sin(\text{azimuth}) + \varepsilon_y$$

where $r_{hy}$ is the horizontal component of an earth rotation vector measured by the second gyroscope, $\varepsilon_y$ is the error measurement of the second gyroscope, $r_e$ is the earth rotation rate, $\varphi$ is the latitude, and azimuth is the true north heading.

11. An apparatus for finding true north, comprising:
a gyroscope configured to measure an angular velocity of a vehicle about an axis, the gyroscope having a measurement axis;
an alignment system configured to determine the orientation of the measurement axis of the gyroscope with respect to true north; and
a rotary stage configured to align the second gyroscope within a range of approximately 0° to approximately 30° of true north; and
a processor programmed to
(a) calculate a first true north heading according to $$\text{azimuth} = \arcsin\left(\frac{r_{hy} - \varepsilon_y}{r_e \cos(\varphi)}\right)$$

where the azimuth is the true north heading, $r_{hy}$ is a horizontal component of an earth rotation vector measured by the second gyroscope, $\varepsilon_y$ is an error measurement of the second gyroscope, $r_e$ is an earth rotation rate, and $\varphi$ is the latitude of the vehicle position; and
(b) estimate a first East/West direction using the calculated azimuth and turn the rotary stage so that the second gyroscope is aligned in the estimated first East/West direction; and
(c) determine a second true north heading according to $$\text{azimuth} = \arcsin\left(\frac{r_{hy} - \varepsilon_y}{r_e \cos(\varphi)}\right)$$

where the azimuth is the second true north heading, $r_{hy}$ is a horizontal component of an earth rotation vector measured by the second gyroscope aligned in the estimated first East/West direction, $\varepsilon_y$ is an error measurement of the second gyroscope, $r_e$ is an earth rotation rate, and $\varphi$ is the latitude of the vehicle position;
(d) estimate a second East/West direction using the second true north heading and turn the rotary stage so that the second gyroscope is aligned in the estimated second East/West direction; and
(e) determine a third true north heading according to $$\text{azimuth} = \arcsin\left(\frac{r_{hy} - \varepsilon_y}{r_e \cos(\varphi)}\right)$$

where the azimuth is the third true north heading, $r_{hy}$ is a horizontal component of an earth rotation vector measured by the second gyroscope aligned in the estimated second East/West direction, $\varepsilon_y$ is an error measurement of the second gyroscope, $r_e$ is an earth rotation rate, and $\varphi$ is the latitude of the vehicle position.

12. A vehicle, comprising:
a vehicle body;
a propulsion system connected to the vehicle body and configured to physically move the vehicle body; and
an inertial north-finding system secured to the vehicle body, the system comprising:
a first gyroscope having a first accuracy, and configured to measure a first angular velocity of a vehicle about a first axis;
a second gyroscope having a second accuracy higher than the first accuracy, and configured to measure a second angular velocity of the vehicle about a second axis that is orthogonal to the first axis; and
a rotary stage securing the first and the second gyroscopes, the rotary stage configured to align the second gyroscope in an East/West direction; and a processor programmed to
(a) calculate a first true north heading according to $$\text{azimuth} = \arcsin\left(\frac{r_{hy} - \varepsilon_y}{r_e \cos(\varphi)}\right)$$

where the azimuth is the true north heading, $r_{hy}$ is a horizontal component of an earth rotation vector measured by the second gyroscope, $\varepsilon_y$ is an error measurement of the second gyroscope, $r_e$ is an earth rotation rate, and $\varphi$ is the latitude of the vehicle position; and
(b) estimate a first East/West direction using the calculated azimuth and turn the rotary stage so that the second gyroscope is aligned in the estimated first East/West direction; and
(c) determine a second true north heading according to $$\text{azimuth} = \arcsin\left(\frac{r_{hy} - \varepsilon_y}{r_e \cos(\varphi)}\right)$$

where the azimuth is the second true north heading, $r_{hy}$ is a horizontal component of an earth rotation vector measured by the second gyroscope aligned in the estimated first East/West direction, $\varepsilon_y$ is an error measurement of the second gyroscope, $r_e$ is an earth rotation rate, and $\varphi$ is the latitude of the vehicle position;
(d) estimate a second East/West direction using the second true north heading and turn the rotary stage so that the second gyroscope is aligned in the estimated second East/West direction; and
(e) determine a third true north heading according to $$\text{azimuth} = \arcsin\left(\frac{r_{hy} - \varepsilon_y}{r_e \cos(\varphi)}\right)$$

where the azimuth is the third true north heading, $r_{hy}$ is a horizontal component of an earth rotation vector measured by the second gyroscope aligned in the estimated second East/West direction, $\varepsilon_y$ is an error measurement of the second gyroscope, $r_e$ is an earth rotation rate, and $\varphi$ is the latitude of the vehicle position.

13. A method for finding true north, comprising:
measuring a first angular velocity of a vehicle about a first axis using a first gyroscope having a first accuracy;
measuring a second angular velocity of the vehicle about a second axis that is orthogonal to the first axis using a second gyroscope having a second accuracy; and
rotating a rotary stage securing the first and the second gyroscopes to align the second gyroscope in an East/West direction; and
calculating a first true north heading according to $$\text{azimuth} = \arcsin\left(\frac{r_{hy} - \varepsilon_y}{r_e \cos(\varphi)}\right)$$

where the azimuth is the true north heading, $r_{hy}$ is a horizontal component of an earth rotation vector measured by the second gyroscope, $\varepsilon_y$ is an error measurement of the second gyroscope, $r_e$ is an earth rotation rate, and $\varphi$ is the latitude of the vehicle position; and
estimating a first East/West direction using the calculated azimuth and turn the rotary stage so that the second gyroscope is aligned in the estimated first East/West direction; and
determining a second true north heading according to $$\text{azimuth} = \arcsin\left(\frac{r_{hy} - \varepsilon_y}{r_e \cos(\varphi)}\right)$$

where the azimuth is the second true north heading, $r_{hy}$ is a horizontal component of an earth rotation vector measured by the second gyroscope aligned in the estimated first East/West direction, $\epsilon_y$ is an error measurement of the second gyroscope, $r_e$ is an earth rotation rate, and $\phi$ is the latitude of the vehicle position;

estimating a second East/West direction using the second true north heading and turn the rotary stage so that the second gyroscope is aligned in the estimated second East/West direction; and determining a third true north heading according to $$\text{azimuth} = \arcsin\left(\frac{r_{hy} - \varepsilon_y}{r_e \cos(\varphi)}\right)$$

where the azimuth is the third true north heading, $r_{hy}$ is a horizontal component of an earth rotation vector measured by the second gyroscope aligned in the estimated second East/West direction, $\epsilon_y$ is an error measurement of the second gyroscope, $r_e$ is an earth rotation rate, and $\phi$ is the latitude of the vehicle position.

14. The method of claim 13, wherein the second accuracy is higher than the first accuracy.

15. The method of claim 14, further comprising processing signals from two or more gyroscopes to obtain a measurement of the second angular velocity.

16. The method of claim 13, further comprising:
　　calculating a measurement error of the second gyroscope; and
　　removing the measurement error from the second angular velocity measurement.

17. The method of claim 13, further comprising determining an east or west direction of the vehicle by using the first angular velocity and the second angular velocity of the vehicle.

\* \* \* \* \*